(12) United States Patent
Myara

(10) Patent No.: US 12,278,823 B2
(45) Date of Patent: Apr. 15, 2025

(54) SECURING THE CONNECTION BETWEEN A VEHICLE AND A REMOTE MANAGEMENT SERVER FOR MANAGING SAID VEHICLE

(71) Applicants: RENAULT S.A.S, Boulogne-Billancourt (FR); NISSAN MOTOR CO., LTD., Yokohama-Shi (JP)

(72) Inventor: David Myara, Toulouse (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 192 days.

(21) Appl. No.: 18/000,670

(22) PCT Filed: May 27, 2021

(86) PCT No.: PCT/EP2021/064155
§ 371 (c)(1),
(2) Date: Dec. 21, 2022

(87) PCT Pub. No.: WO2021/244932
PCT Pub. Date: Dec. 9, 2021

(65) Prior Publication Data
US 2023/0262070 A1    Aug. 17, 2023

(30) Foreign Application Priority Data

Jun. 4, 2020 (FR) ...................................... 20 05876

(51) Int. Cl.
*H04W 12/45* (2021.01)
*H04L 9/40* (2022.01)
(Continued)

(52) U.S. Cl.
CPC ........... *H04L 63/1408* (2013.01); *H04W 4/44* (2018.02); *H04W 12/03* (2021.01); *H04W 12/121* (2021.01); *H04W 12/45* (2021.01)

(58) Field of Classification Search
CPC .... H04L 63/1408; H04W 4/44; H04W 12/03; H04W 12/121; H04W 12/45; H04W 88/06
See application file for complete search history.

(56) References Cited

U.S. PATENT DOCUMENTS 9,036,509 B1 * 5/2015 Addepalli ............... H04L 69/18
701/1
10,484,370 B2 * 11/2019 Wimböck ............... H04L 67/12
(Continued)

FOREIGN PATENT DOCUMENTS

DE   10 2016 007 183 A1   12/2017
DE      102016218736 A1 *  3/2018   .............. H04W 4/48
(Continued)

OTHER PUBLICATIONS

International Search Report and Written Opinion issued Jul. 27, 2021 in PCT/EP2021/064155 (with unedited computer generated English Translation), 25 pages.
(Continued)

Primary Examiner — Michael R Vaughan
Assistant Examiner — Abdullah Almamun
(74) Attorney, Agent, or Firm — Oblon, McClelland, Maier & Neustadt, L.L.P.

(57) ABSTRACT

A vehicle includes a communication module capable of using two telecommunication identifier cards, one relating to a subscription between a constructor of the vehicle and a telecommunications operator, the other relating to a subscription between a user of the vehicle and a telecommunications operator. The vehicle includes a trusted execution
(Continued)

environment hosting security functions of the vehicle and a multimedia system execution environment hosting at least a part of the communication module. The trusted execution environment includes a supervision module monitoring the connection between the vehicle and a remote management server of the vehicle.

10 Claims, 4 Drawing Sheets

(51) Int. Cl.
  *H04W 4/44* (2018.01)
  *H04W 12/03* (2021.01)
  *H04W 12/121* (2021.01)

(56) References Cited

U.S. PATENT DOCUMENTS

| | | |
|---|---|---|
| 2009/0325572 A1 | 12/2009 | Ji |
| 2016/0050609 A1 | 2/2016 | Erickson et al. |
| 2019/0124703 A1 | 4/2019 | Rottenkolber |
| 2021/0168602 A1* | 6/2021 | Kim .................... H04W 12/041 |
| 2022/0286473 A1* | 9/2022 | Ujiie ...................... H04L 67/12 |
| 2023/0087311 A1* | 3/2023 | Soffer ................ H04L 63/1416 |

FOREIGN PATENT DOCUMENTS

| | | |
|---|---|---|
| DE | 10 2017 128 063 A1 | 5/2019 |
| KR | 102056529 B1 * | 10/2019 |
| WO | WO-2017215802 A1 * | 12/2017 ............ H04W 4/046 |

OTHER PUBLICATIONS

Preliminary French Search Report issued Jan. 25, 2021 in French Patent Application No. 2005876 (with English Translation of Category of Cited Documents), 3 pages.

Anonymous, "Trusted Execution Environment TEE 101 : A Primer White Paper", Secure Technology Alliance, Apr. 1, 2018, pp. 1-24, Retrieved from the Internet: https://www.securetechalliance.org/wp-content/uploads/TEE-101-White-Paper-FINAL2-Apr. 2018.pdf, XP055768342.

* cited by examiner

SECURING THE CONNECTION BETWEEN A VEHICLE AND A REMOTE MANAGEMENT SERVER FOR MANAGING SAID VEHICLE

BACKGROUND

The present invention relates generally to telecommunications and motor vehicles, and relates more specifically to the securing of the telematics services supplied to a vehicle and the software of this vehicle.

The telematics services offered by a constructor on a vehicle elaborate and use sensitive data and functions. These services are generally performed by, on the one hand, embedded logic resident in the vehicle and, on the other hand, external logic resident on at least one remote server of the constructor or of a third party. One fundamental issue in the securing of the telematics services and of the software of the car in general revolves around the communication link between these two logics. In fact, to achieve a good level of security, the constructor sets up secured communication mechanisms between the embedded part and the external part of the software of these telematics services. It also sets up administration centers for its vehicle stock. These administration tools allow the constructor to detect anomalies and trigger preventive or corrective actions in the vehicle to respond to malfunctions or to potential cyber-attacks, by updating software of the vehicle for example.

However, this securing strategy proves ineffective when the vehicle does not have network coverage and cannot dialog with the remote server of the constructor, or when the communication between the vehicle and the remote server can no longer be considered reliable and trusted. One means for strengthening the security of the connection between the embedded part of telematics service software in the vehicle and its external part is to obtain additional protection and additional counter measure capabilities implemented by the telecommunications operator to which the constructor of the vehicle subscribes.

However, alongside the setting up of these telematics services there is an emerging and growing need to bring the internet to the users of the vehicles. Furthermore, there is a strong demand for the users of cars to be able to use their own cellular telephone subscription for this internet use.

Now, an internet connection brings back a set of threats and of potential breaches which can allow hackers to take control of the electronic parts which use this connection. Not only that, the fact of using, for this internet connection, a telecommunications operator different from that of the constructor of the vehicle concerned, with a subscription specific to the user, prevents benefiting from the protections and corrective measures that the telecommunications operator of the constructor can offer to secure the telematics services used by the vehicle.

There is therefore a need to secure the communication between a vehicle and its remote administration center, while allowing the users of the vehicle to connect to the internet via their cellular telephone subscription.

One solution is to segregate the connections and systems for the internet on the one hand and for the telematics services on the other hand. Since the users use their own cellular telephone subscription, that means that the physical cellular communication systems must be duplicated: either with two cellular modems instead of just one, or with one cellular modem that can operate with two SIM (subscriber identity module) cards that are active at the same time, a capability referred to as "active dual-SIM". In both of these cases, this duplication represents a very significant cost overhead (several tens of dollars per vehicle).

BRIEF SUMMARY

One of the aims of the invention is to remedy at least some of the drawbacks of the prior art by supplying, at a lesser cost, a vehicle, a system and a method which guarantee a trusted communication between the vehicle and the administration center managing the cyber security of the vehicle, while allowing a user of the vehicle to access the internet via his or her own cellular telephone subscription.

To this end, the invention proposes a vehicle comprising a communication module capable of using two telecommunication identifier cards, one relating to a subscription between the constructor of said vehicle and a telecommunications operator, the other relating to a subscription between a user of said vehicle and a telecommunications operator, said vehicle comprising a trusted execution environment hosting security functions of the vehicle, and a multimedia system execution environment hosting at least a part of said communication module, said vehicle being characterized in that said trusted execution environment comprises a supervision module monitoring the connection between said vehicle and a remote management server of said vehicle.

By virtue of the invention, a single modem uses either a connection using the subscription of the vehicle, or a connection using the subscription of the user, but the connection between the vehicle and the remote server is monitored. Thus, as soon as the connection using the user subscription is no longer considered reliable or trusted, the modem can, for example, switch over to the SIM card of the constructor of the vehicle to benefit from the cyber-attack prevention and correction measures, these measures being supplied by the operator linked to the constructor, without requiring any costly "active dual-SIM" modem.

Advantageously, said supervision module is capable of regularly testing said connection by sending and receiving signed, unique and predefined messages, respectively to said remote management server and from said remote management server. This implementation notably provides replay protection.

In a variant embodiment of the invention, said supervision module is capable of regularly testing said connection by receiving signed, unique and predefined messages, from said remote management server. In this variant, the supervision module does not therefore send test messages but monitors the correct reception of test messages.

Advantageously again, said supervision module is capable of detecting a connection anomaly when:
said communication module indicates that the cellular connection of the vehicle is operating while said communication module does not confirm the sending of one of said messages to said remote management server or it does not transmit one of said messages sent by said remote management server,
or said communication module indicates that the cellular connection of the vehicle is unavailable for a time greater than a first predefined time interval.

This implementation makes it possible to simply detect an anomaly of the communication module, suspected because it is not caused by a brief and limited loss of radio coverage. In this application, "cellular connection" of the vehicle is understood to mean the capacity to receive or send messages by radio notably by virtue of adequate cellular telephone network coverage.

Advantageously again, the messages sent by said supervision module comprise information representative of detection of a connection anomaly between said vehicle and said remote management server, or representative of the absence of such detection. That allows the remote management server to intervene to rule out or confirm the anomaly when that is possible, and to implement curative actions such as a remote vehicle software update.

According to another advantageous feature, the vehicle according to the invention comprises at least one of the sending means chosen from a list comprising:
- a first means for sending an instruction to the communication module, triggering the disabling of the external communications for the unsecured applications of the vehicle,
- a second means for sending an instruction to the communication module, triggering the selection by the communication module of the telecommunications identifier card relating to the subscription of the constructor of said vehicle as sole connection means, and the disabling by the communication module of any communication other than with said remote management server,
- a third means for sending an instruction to the communication module, triggering the restart of said communication module, and of an instruction provoking the restart of said multimedia system execution environment, while imposing a secured configuration on said restarts,
- and a fourth means for sending an instruction triggering the restart of at least a part of other execution environments or of other software of the vehicle while imposing on them a secured configuration, said vehicle further comprising activation means configured to activate all or part of said sending means chosen on detection of a connection anomaly between said vehicle and said remote management server.

By incorporating one or more of these four sending means, the vehicle according to the invention benefits from a curative solution that is independent of the remote management server.

Advantageously, the vehicle according to the invention comprises at least said first sending means, said activation means being configured to activate only said first sending means when said communication module indicates that the cellular connection of the vehicle is unavailable for a time greater than said first predefined time interval. Thus, excessively degrading the user experience in the event of false anomaly detection due to a loss of radio coverage is avoided.

Advantageously again, the vehicle according to the invention comprises at least said second sending means, said activation means being configured to activate said second sending means excluding the sending means chosen from among said third or fourth sending means, when said communication module indicates that the cellular connection is unavailable for a time greater than a second predefined time interval greater than the first predefined time interval. Thus, even if the vehicle according to the invention incorporates the third and/or the fourth sending means, the latter are not implemented initially, notably as long as the vehicle is not stopped. The remote management server SG thus has time to intervene to avoid the implementation of the third and fourth sending means in the event of false detection. There is thus little degradation of the user experience while securing the vehicle when the probability of a suspect anomaly becomes greater.

Advantageously again, the vehicle according to the invention comprises at least said third or said fourth sending means, said activation means being configured to activate said third or fourth sending means only when said vehicle is stopped. That makes it possible to impair the user experience to secure the vehicle only at the most opportune moments, notably outside of a vehicle running phase.

The invention relates also to a system comprising a vehicle according to the invention, and said remote management server, characterized in that said remote management server comprises:
- means for receiving a message sent by said supervision module and comprising information representative of detection of a connection anomaly between said vehicle and said remote management server,
- means for detecting the fact that said anomaly detection is not due to a cyber-attack by correlation between the position of said vehicle and radio coverage data,
- means for sending a message indicating that said anomaly is not due to a cyber-attack on said vehicle, in response to said message from said supervision module and reporting said anomaly detection.

Thus, the remote management server prevents the vehicle from conducting curative actions impairing the user experience upon a false detection due to a momentary or lengthy loss of radio coverage.

Advantageously, said remote management server further comprises:
- a means for detecting a cyber-attack as soon as anomalies are reported by a number of vehicles greater than a predefined threshold,
- means for sending to said vehicle a message activating a procedure for secured restart of said communication module and of said multimedia execution environment and/or to update said multimedia execution environment as soon as a cyber-attack is detected by said detection means. This additional feature makes it possible to protect the vehicle against a predefined future cyber-attack.

The invention relates finally to a method for securing the connection between a vehicle according to the invention and said remote management server of said vehicle, comprising the steps of:
- sending and/or receiving signed, unique and predefined messages, respectively to said remote management server and/or from said remote management server,
- detecting an anomaly on said connection,
- sending an instruction to said communication module, capable of switching the communication between said vehicle and said remote management server over to a connection using the telecommunication identifier card relating to the subscription of the construction of said vehicle.

BRIEF DESCRIPTION OF THE DRAWINGS

The system and the method according to the invention offer advantages similar to those of the vehicle according to the invention.

Other features and advantages will become apparent upon reading a preferred embodiment described with reference to the figures in which.

DETAILED DESCRIPTION

Figure 1:
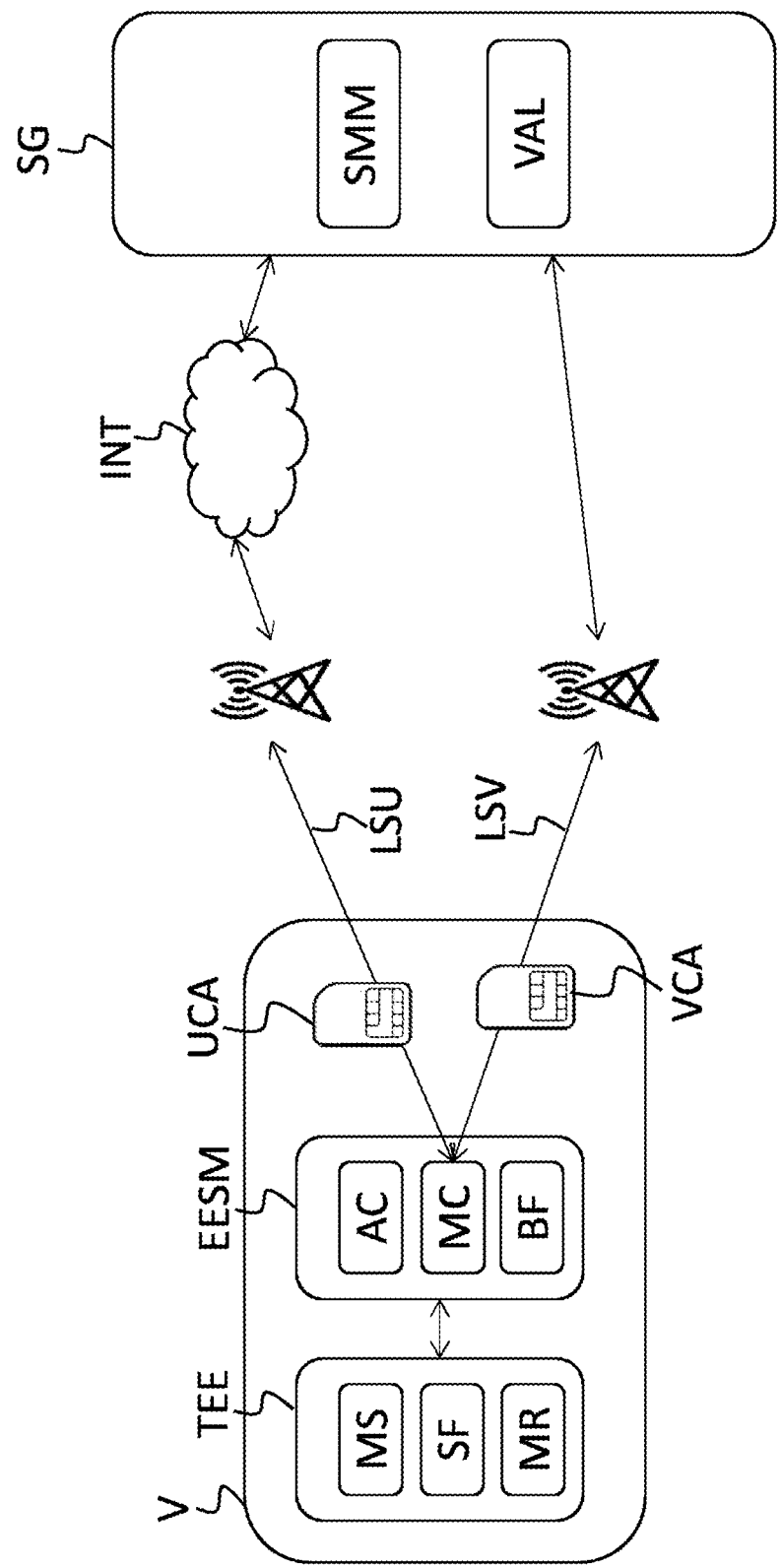
FIG. 1 represents a vehicle and a system according to the invention, in this preferred embodiment of the invention.

According to a preferred embodiment of the invention represented in FIG. 1, a vehicle V according to the invention comprises various execution environments hosting various software. In particular the security software of the vehicle V such as the engine control software or driving assistance software are hosted on secured computers, for example accessible only via a secured gateway incorporating a trusted execution environment TEE. In this exemplary embodiment of the invention, the trusted environment TEE hosts security functions SF of the vehicle V, and a module MR hosting curative functions that are triggered in the event of detection of a cyber-attack, and a module MS for supervising the connection between the vehicle V and a remote management server SG of the vehicle V. The trusted environment TEE is, for example, hosted in the secured gateway which makes the link between the secured software zone of the vehicle giving access to the secured computers of the vehicle, and the software zone including the multimedia communication functionalities communicating with the outside of the vehicle.

The vehicle V also comprises at least one unsecured execution environment, here the execution environment EESM of a multimedia system hosting the so called "infotainment" information and leisure part of the vehicle V. The execution environment EESM therefore hosts applications AC intended for the use of the users of the vehicle and which are exposed to the data streams from or to the internet, such as geolocation services, embedded browsers, etc. The execution environment EESM also hosts non-security functions BF of the vehicle such as audio output setting functions or graphical interfaces of the vehicle V.

Finally, the execution environment EESM hosts a communication module MC. The communication module MC incorporates a cellular radio modem capable of converting Ethernet network signals into GSM ("global system for mobile communications"), 3G, 4G, 5G (G representing the mobile telephony technology generation) or Wi-Fi (according to the IEEE 802.11 standards) radio signals and vice versa. In a variant embodiment, the communication module MC converts other types of wired protocols into other types of radio protocols, notably according to the country of use of the vehicle and its electrical/electronic architecture. For example, in a variant, the modem is used to convert CAN (Controller Area Network) signals into CDMA2000 signals.

Although the communication module MC is incorporated in the execution environment EESM, notably to allow the unsecured applications to communicate externally, some of its functions are secured. These secured functions are implemented by a secured electronic circuit, or in a secured computer such as a microcontroller. The execution environment EESM therefore incorporates unsecured software but also secured software and/or hardware circuits. These functions notably allow the trusted execution environment TEE to force the communication module MC to switch over to a telecommunications identifier card specific to the constructor of the vehicle V as described later. It is of course possible to consider, in a variant, that the secured part of the communication module MC forms part of the trusted execution environment TEE.

The modem of the communication module MC has the "dual-SIM" capability which allows it to use two SIM cards, which are, in this embodiment:
 a telecommunications identifier SIM card referenced UCA relating to the subscription between a user of the vehicle V and a telecommunications operator,
 a telecommunications identifier SIM card referenced VCA relating to the subscription between the constructor of the vehicle V and a telecommunications operator which can be different from the telecommunications operator that supplied the UCA card.

The UCA card that the communication module MC uses is, for example, a virtual SIM, that is to say that the user does not need to place his or her SIM card in a specific slot of the modem of the vehicle V, but that he or she simply has to enter data authenticating his or her personal SIM card in the vehicle for the latter to generate this virtual SIM card. In a variant, the communication module MC has a physical slot allowing the user to insert his or her personal SIM card therein.

In this embodiment of the invention, the modem of the communication module MC does not have the capability to use both the UCA and VCA cards, but simply the capability to use one or other of these cards at a time, by switching from one card to the other to set up a communication with the outside depending on the context. It therefore does not have the so-called "active dual-SIM" capability. For example, when the user of the vehicle V uses the execution environment EESM to go to the internet, the communication module uses the UCA card to set up a communication session LSU with the internet network INT. This communication session is set up with a standard level of security specific to an individual cellular telephone subscription, and can be used to communicate also with the remote management server SG. When the vehicle V is stopped with the engine off and the doors closed without a user in the interior, and communicates with the remote management server SG for maintenance reasons, the communication module MC on the other hand uses the VCA card to set up a communication session LSV with the remote management server SG. This communication session LSV benefits from a level of security that is possibly greater than the level of security of the communication session LSU, for example using a secured APN ("Access Point Name").

The communication module MC also has the capacity to report the state of the cellular connection to the execution environment TEE. In particular, it indicates if the radio network coverage is too weak or absent to set up a communication session externally.

The remote management server SG comprises a logic VAL for general administration of the vehicles of the constructor, and a supervision module SMM for monitoring the communication link between the vehicle V and the remote management server SG.

Figure 2:
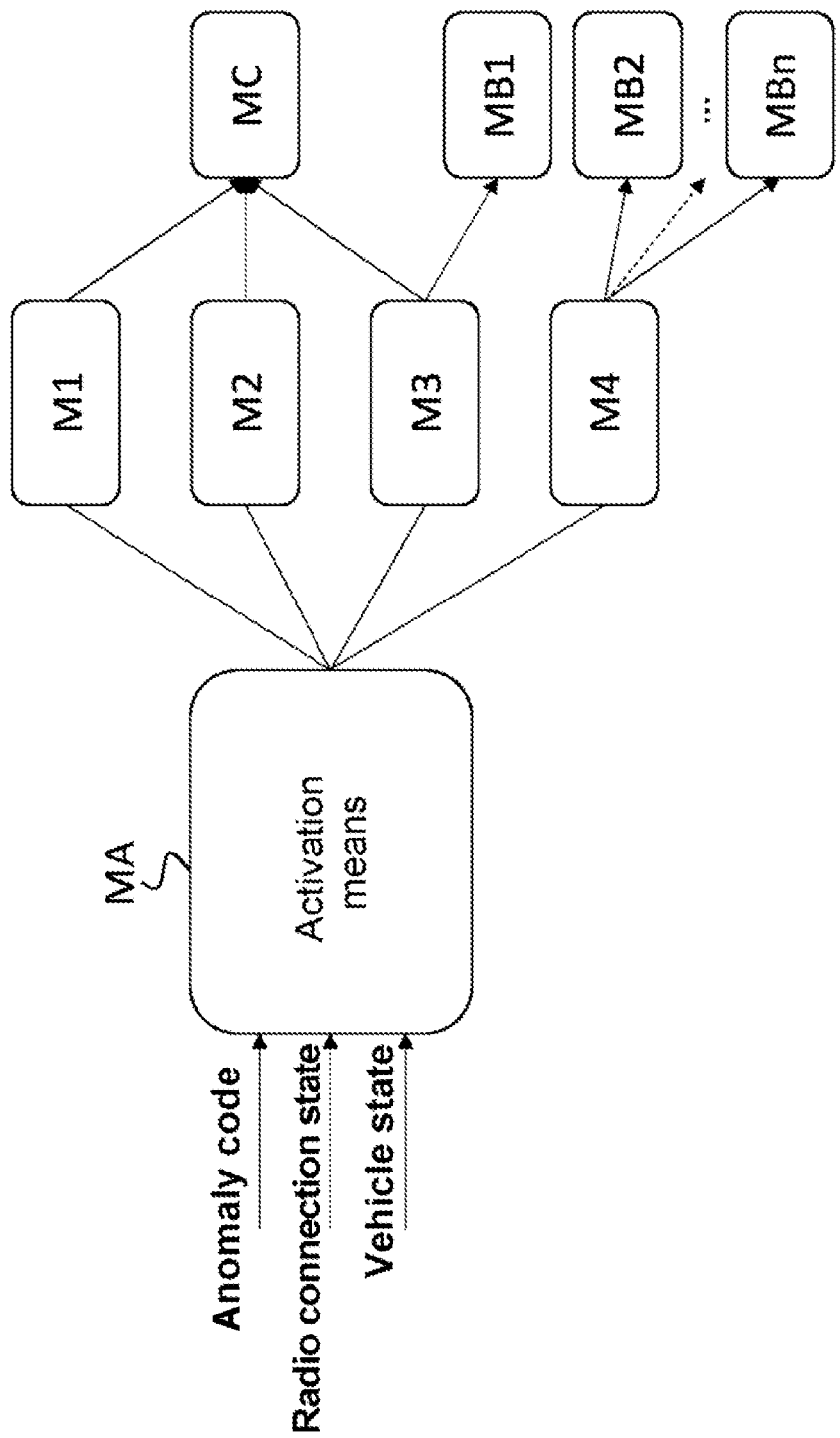
FIG. 2 represents curative means of the vehicle according to the invention, in this preferred embodiment of the invention.

The main risk when using the UCA card is of an attack coming from the internet allowing a hacker to take control of the computers and unsecured execution environments of the vehicle, which could allow the hacker to cut the communication between the remote management server SG and the trusted execution environment TEE, preventing the latter from receiving commands to trigger corrective actions and revert to normal. In order to remedy this problem, the supervision module MS monitors the connection between the vehicle V and the remote management server SG when the vehicle V is in use, in particular by testing this connection regularly. The supervision module is thus capable of detecting an abnormal interruption of the communication between the vehicle V and the remote management server SG. When such a connection anomaly is detected, the supervision module MS activates security functions SF, implemented in modules M1 to M4, as represented in FIG. 2. It should therefore be understood in this application that the supervision module MS puts in place supervision of the connection between the vehicle and the remote management server SG, distinct from the standardized supervision mechanisms implemented by the communication module MC, notably distinct from the message encryption mechanisms as made mandatory by the GSM, 3G, 4G, 5G or Wi-Fi communication standard used by the communication module MC. Indeed, this supervision module is capable of detecting an abnormal interruption of the communication between the vehicle V and the remote management server SG, that is to say one due to an infringement of the software integrity of the communication module MC.

More specifically, the supervision module MS comprises an activation module MA receiving as input an anomaly code, the state of the cellular connection and the state of the vehicle V. Based on these input parameters, the activation module MA activates one or more of the modules M1 to M4.

The module M1 is a software means for sending an instruction to the secured microcontroller of the communication module MC, triggering the disabling of external communications for the unsecured applications of the vehicle, that is to say cutting any communication emanating from the execution environment EESM and to the internet.

The module M2 is a software means for sending an instruction to the secured microcontroller of the communication module MC, triggering the selection by the communication module MC of the VCA card to communicate externally, and the disabling by the communication module MC of any communication other than with the remote management server SG.

The module M3 is a software means for sending an instruction to the secured microcontroller of the communication module MC, triggering the restart of the communication module MC, and of an instruction to a secured part MB1 of the execution environment EESM to restart the latter. In a variant, just one instruction is necessary, notably when the microcontroller is linked to the secured part MB1. These secured restarts trigger the erasure of the random access memory of these systems, and force the selection of the VCA card to communicate with the remote management server SG, without connection to the internet.

The module M4 is a software means for sending an instruction triggering the secured restart of all or part of the other execution environments or other software MB2 to MBn of the vehicle V. This secured restart triggers the erasure of the random access memory of these other environments and software and if necessary blocks the use of certain software parts which are more sensitive to the attacks than others.

Figure 3:
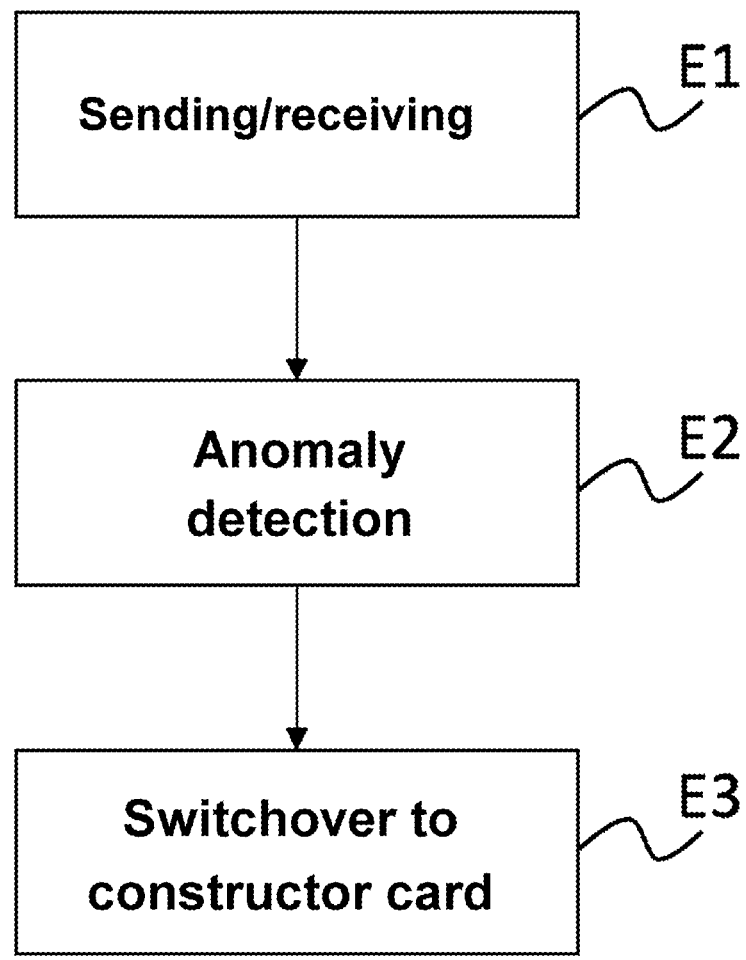
FIG. 3 represents steps of a method according to the invention, in this preferred embodiment of the invention.

One example of use of one of these means by the supervision module MS is represented in the form of a method for securing the connection between the vehicle V and the remote management server SG according to the invention, in FIG. 3. In this example, the communication module MC initially uses the UCA card to communicate externally.

The step E1 is the sending and the receiving of signed, unique and predefined messages, respectively to the remote management server SG and from the vehicle V by the supervision module MS. For that, the supervision module MS sends a message periodically to the remote management server SG, which allows the remote management server SG to authenticate it. This message is, for example, signed by using an asymmetrical encryption algorithm such as RSA (Rivest, Shamir and Adleman) encryption. In a variant, the supervision module MS uses a signature obtained by a hashing algorithm of HMAC ("keyed-hash message authentication code") type using an encryption key known only to the constructor (and contained securely in the vehicle V and the remote management server SG). Of course, other symmetrical or asymmetrical encryption algorithms can be used for the signing of the messages sent by the supervision module MS. These messages also comprise a replay prevention datum such as a time stamp, a count or a predefined number generated by an algorithm known only to the vehicle V and to the remote management server SG. The messages sent by the supervision module MS also comprise an anomaly code, the values and meanings of which are, for example:

0: no anomaly detected by the supervision module MS
  1: break in connection with indication by the communication module MC of a lack of network coverage for a time greater than a first predetermined time threshold T1
  2: break in connection with indication by the communication module MC of a lack of network coverage for a time greater than a second predetermined time threshold T2 greater than the first predetermined time threshold T1
  3: unexplained break in connection.

The first predetermined time threshold T1 is for example set at 30 minutes and the second predetermined time threshold T2 is for example set at 60 minutes.

It should be noted that, in this embodiment of the invention, the anomaly codes are oriented notably on breaks in connection due to true or false network coverage outages, for simplicity. In practice, the anomaly codes are possibly more nuanced. For example, in a variant, a different code is applied to the following situations:

the supervision module MS has sent a test message and received an immediate protocol reply, but is not receiving a response from the remote management server SG,
  the supervision module MS has sent a test message but has not received any immediate protocol reply, even though the communication module MC indicates that a connection is set up with the remote management server SG,
  the supervision module MS has not managed to transmit a test message and the communication module MC indicates that there is no longer a connection set up with the remote management server SG, even though the cellular connection is working in data transfer mode,
  the communication module MC indicates that there is no longer a cellular connection available in data transfer mode even though network coverage is available,
  the communication module MC indicates that there is no longer network coverage.

In this variant, time counters are for example applied, corresponding to the times T1 and T2, more broadly in the cases where the communication module MC indicates that there is no longer a connection set up with the remote server SG, in order to activate the modules M1 and, respectively, M2.

The messages sent by the remote management server SG in response to the messages that it receives from the supervision module MS are signed and comprise a replay prevention datum, in a way similar to the messages sent by the supervision module MS. In addition, the response messages from the remote management server SG possibly comprise information confirming or ruling out the existence of a lack of network coverage previously reported by the supervision module MS, or an instruction triggering a curative action on the vehicle V, such as a software update or a secured restart instruction as soon as the vehicle V is stopped.

The step E2 of the method is the detection of a connection anomaly by the supervision module MS. The supervision module MS detects such an anomaly:

when it does not receive a response to one of the messages that it has sent, or when the communication module MC indicates not having been able to transmit one of the messages from the supervision module MS to the remote management server SG, even though the communication module MC indicates that network coverage is available. This detection is made possibly after several retransmission tests or on expiry of a time counter set to a predefined response time, for example set at 15 minutes; this detection corresponds to the anomaly code 3 defined above;

when the communication module MC indicates that the network coverage is unavailable, from a time greater than a predefined time threshold T1 or T2; this detection corresponds to the anomaly code 1 or 2 defined above based on the corresponding threshold.

The step E3 is the activation of curative means by the supervision module MS, making it possible to re-establish a trusted communication between the vehicle V and the remote management server SG even if the execution environment EESM is compromised by an attack. These means are chosen so as to best preserve the user experience, notably in the case where the anomaly detected does not correspond to a cyber-attack but to a genuine loss of the network coverage. For that, the impact in terms of possibilities of connection of the user and of the vehicle V is gradually increased as a function of the state of the vehicle V and of the real risk of cyber-attack. For example, when the communication module MC indicates a lack of network coverage, the supervision module MS makes more attempts to resend a message than when the communication module MC indicates available network coverage. Likewise, the predefined time thresholds T1 or T2 are, for example, set based on geolocation data. Thus, if the vehicle detects entry into a white zone, these thresholds are for example adapted to the estimated time of travel in this zone. Based on the anomaly code detected, the curative actions also have more or less impact. In this example of use of the invention, it is assumed that the vehicle V is in use and that the anomaly code reported is 3. In this case, the step E3 consists in the activation of the module M2, which triggers the switching of the communication between the vehicle V and the remote management server SG over to a connection using the VCA card. In other words, the module M2 sends an instruction to the communication module MC to temporarily cut the communication between the vehicle V and the remote management server SG and re-establish a connection between these two entities by using the subscription of the constructor of the vehicle V.

Once the communication is re-established between the vehicle V and the remote management server SG, the supervision module MS sends the anomaly code 3 in a message to the remote management server SG. The supervision module SMM of the remote management server SG then sends in the corresponding response message or separately, an instruction allowing the implementation of a curative action by the security functions SF of the vehicle, for example a software update or a secured restart of the environment EESM, which will be implemented as soon as the vehicle is stopped, preferentially with the engine off. In the event of a non-response from the remote management server SG, the vehicle V itself implements this curative action.

It should be noted that, after communication has been re-established between the vehicle V and the remote management server SG, when the anomaly code reported by the supervision module is 1 or 2, the remote management server SG can check whether the vehicle V is in a zone in which the network coverage is effectively poor or non-existent. If such is the case, the supervision module SMM of the remote management server SG informs the vehicle V that it was in such a zone as soon as the communication with the vehicle V is re-established, which makes it possible to avoid a pointless secured restart of the execution environment EESM the next time the vehicle V is stopped. On the other hand, when such is not the case, the supervision module SMM of the remote management server SG informs the vehicle V of this as soon as the communication with the vehicle V is re-established and sends it a secured restart instruction or an instruction to update the execution environment EESM as soon as the vehicle is stopped, preferentially with the engine off. It should be noted that, preferentially, the secured restarts of the communication module MC and of the environment EESM are deferred for a few tens of seconds after the vehicle is stopped for the end of mission processing operations not to be interrupted. In addition, when the vehicle is stopped, the sending and the receiving of test messages are stopped to preserve the battery of the vehicle.

In addition, since the remote management server SG administers an entire stock of vehicles, it is able to detect a cyber-attack by correlation of the anomalies reported by the vehicles of this stock. Notably, if this stock of vehicles reports a number of anomalies greater than a predefined threshold, for example 1000 over a short period, and over geographic zones comprising acceptable network coverage, the supervision module SMM detects a cyber-attack and programs a software update on its vehicles with a secured restart.

Figure 4:
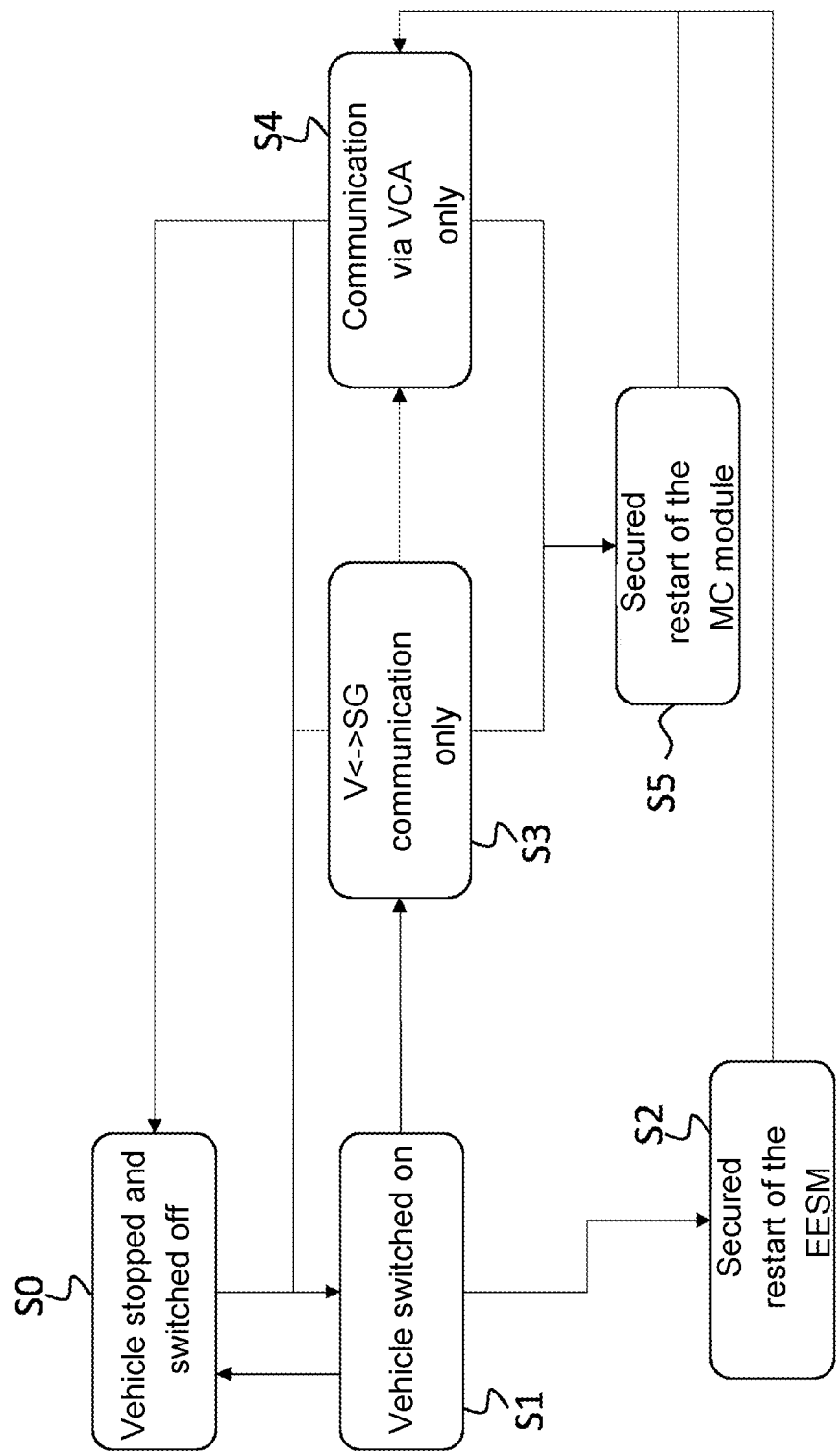
FIG. 4 represents a state diagram of a curative logic implemented in the vehicle according to the invention, in this preferred embodiment of the invention.

Referring to FIG. 4, an example of logic implemented in the supervision module MS and that makes it possible to minimize the impact of the securing method according to the invention on the user experience, comprises the states S0 to S5.

In the state S0, the vehicle V is stopped with the engine off and with the ignition off, that is to say that the ignition switch is not set. In this state, the vehicle V communicates with the remote management server SG only with the VCA card, and no internet communication is established. When a user switches on the vehicle V with the ignition switch, the logic switches to the state S1.

In the state S1, the user can enter the data of his or her personal SIM card in the vehicle and access the internet over the execution environment EESM via the UCA card. If these data have already been entered into the vehicle V in a prior use of the vehicle V, the communication module MC switches over to the UCA card as soon as the vehicle is switched on. The supervision module MS then supervises the connection between the vehicle V and the remote management server SG. In this state S1, the logic returns to the state S0 when the user switches off the vehicle.

If, in the state S1, the supervision module MS receives an instruction from the remote management server SG to perform a secured restart of the communication module MC and of the execution environment EESM with a possible update of these entities, then the logic switches to the state S2 for secured restart (with possible update) of these entities. After this secured restart in this state S2 the logic switches to the secured communication state S4 which will be described later.

If, in the state S1, the supervision module MS detects a code 1 or 3 anomaly, then the supervision module MS activates the module M1 and the logic switches to the state S3 in which the communication module MC continues to use the UCA card but prohibits any internet communication other than with the remote management server SG.

If, in this state S3, the supervision module MS detects a code 2 or 3 anomaly, that is to say that the communication module MC indicates that there has been no network coverage for an hour and that the communication module MC has no longer been sending or receiving messages for fifteen minutes without an indication of loss of network coverage, then the logic switches to the secured communication state S4.

If, in the state S3, the vehicle V is switched off by the user without the remote management server SG having been able to rule out the code 1 or 3 anomaly which triggered the switch to the state S3 and notify the vehicle V thereof, then the logic switches to the state S5 of secured restart of the communication module MC, forcing the communication module to use only the VCA card; after this restart, the logic switches to the secured communication state S4.

If, in the state S3, the remote management server SG rules out the code 1 or 3 anomaly which triggered the switch to the state S3, then the logic switches to the state S1.

In the secured communication state S4, the communication module MC is authorized to use only the VCA card to communicate with the remote management server SG, whether the vehicle V is switched on or switched off. If the vehicle V is switched on in this state S4, and the user switches off his or her vehicle without the remote management server SG having been able to rule out the code 1, 2 or 3 anomaly that led to the switch to the state S4 and notify the vehicle V thereof, then the logic loops back to the state S4. On the contrary, if, in this state S4, the remote management server SG rules out the code 1, 2 or 3 anomaly that led to the switch to the state S4 and notifies the vehicle V thereof, then the logic loops back to the state S0 if the vehicle is switched off, or to the state S1 if the vehicle is switched on.

Obviously, this logic is only an exemplary embodiment of the invention. Other logics can be implemented in other variant embodiments of the vehicle, of the system or of the method according to the invention. For example, in a variant in which the vehicle implements only the modules M2 and M3, the states S3 and S4 are merged. In addition, in another variant embodiment of the invention, the remote management server SG is held by a third party. In this variant, the exchange of a private key for the signing of the messages exchanged between the supervision module MS and the remote management server SG is performed by a first encrypted exchange which for example uses the RSA asymmetrical encryption algorithm. Many other variant embodiments are of course possible. Notably, in another variant embodiment of the invention, the supervision module MS supervises the correct operation of the connection between the communication module MC and the remote management server SG by monitoring the correct reception of signed, unique and predefined messages sent by the remote management server SG, but does not itself send test messages to the remote management server SG. This variant however covers only a supervision of the connection in one direction. In another variant, the supervision module sends test messages to the remote supervision server SG, these test messages not containing an anomaly code, or containing one only when an anomaly is detected. Finally, in another variant, the management server SG sends a message alerting the vehicle V just before the latter enters into a white zone, in order to deactivate the time counters linked to the thresholds T1 and T2, until the white zone has been exited.

The invention claimed is:

1. A vehicle comprising:
   circuitry configured to implement:
   a communication module configured to use two telecommunication identifier cards, one relating to a subscription between a constructor of said vehicle and a telecommunications operator, an other relating to a subscription between a user of said vehicle and a telecommunications operator;
   a trusted execution environment hosting security functions of the vehicle; and
   a multimedia system execution environment hosting at least a part of said communication module,
   wherein said trusted execution environment comprises a supervision module that monitors a connection between said vehicle and a remote management server of said vehicle, and when the supervision module detects an anomaly in the connection, the supervision module is configured to:
   send a first instruction to the communication module, triggering a disabling of external communications for unsecured applications of the vehicle, when said communication module indicates that the cellular connection of the vehicle is unavailable for a time greater than a first predefined time interval, and
   send a second instruction to the communication module, triggering a selection by the communication module of the telecommunication identifier card relating to the subscription of the constructor of said vehicle as a sole connection means, and the disabling by the communication module of any communication other than with said remote management server, when said communication module indicates that the cellular connection of the vehicle is unavailable for a time greater than a second predefined time interval greater than the first predefined time interval.

2. The vehicle as claimed in claim 1, wherein said supervision module is configured to regularly test said connection by sending and receiving signed, unique and predefined messages, respectively to said remote management server and from said remote management server.

3. The vehicle as claimed in claim 2, wherein said supervision module is configured to detect the anomaly when:
   said communication module indicates that the cellular connection of the vehicle is operated while said communication module does not confirm the sending of one of said messages to said remote management server or it does not transmit one of said messages sent by said remote management server, or
   said communication module indicates that the cellular connection of the vehicle is unavailable for a time greater than a first predefined time interval.

4. The vehicle as claimed in claim 2, wherein the messages sent by said supervision module comprise information representative of a detection of the between said vehicle and said remote management server, or representative of an absence of such a detection.

5. The vehicle as claimed in claim 1, wherein said supervision module is configured to regularly test said connection by receiving signed, unique and predefined messages, from said remote management server.

6. The vehicle as claimed in claim 1, wherein the supervision module is configured to
send a third instruction to the communication module, triggering a restart of said communication module, and provoking a restart of said multimedia system execution environment, while imposing a secured configuration of said restarts, and
send a fourth instruction triggering a restart of at least a part of other execution environments or of other software of the vehicle while imposing on them a secured configuration.

7. The vehicle as claimed in claim 6, wherein said supervision module is configured to send said third or fourth instruction only when said vehicle is stopped.

8. A system comprising:
the vehicle as claimed in claim 1, and
said remote management server, wherein said remote management server comprises circuitry configured to:
receive a message sent by said supervision module and comprising information representative of a detection of said anomaly between said vehicle and said remote management server,
detect the fact that said anomaly detection is not due to a cyber-attack by correlation between a position of said vehicle and radio coverage data, and
send a message indicating that anomaly is not due to a cyber-attack on said vehicle, in response to said message from said supervision module and reporting said anomaly detection.

9. The system as claimed in claim 8, wherein said circuitry of said remote management server is further configured to:
detect a cyber-attack as soon as anomalies are reported by a number of vehicles greater than a predefined threshold, and
send a message to said vehicle activating a procedure for secured restarting of said communication module and of said multimedia execution environment and/or for updating said multimedia execution environment as soon as the cyber-attack is detected.

10. A method for securing the connection between the vehicle as claimed in claim 1 and said remote management sever of said vehicle, the method comprising:
sending and/or receiving signed, unique and predefined messages, respectively to said remote management sever and/or from said remote management server,
detecting the anomaly on said connection, and
sending an instruction to said communication module, configured to switch the communication between said vehicle and said remote management server over to a connection using the telecommunication identifier card relating to the subscription of the constructor of said vehicle.

* * * * *